Figures 1, 2, 3:
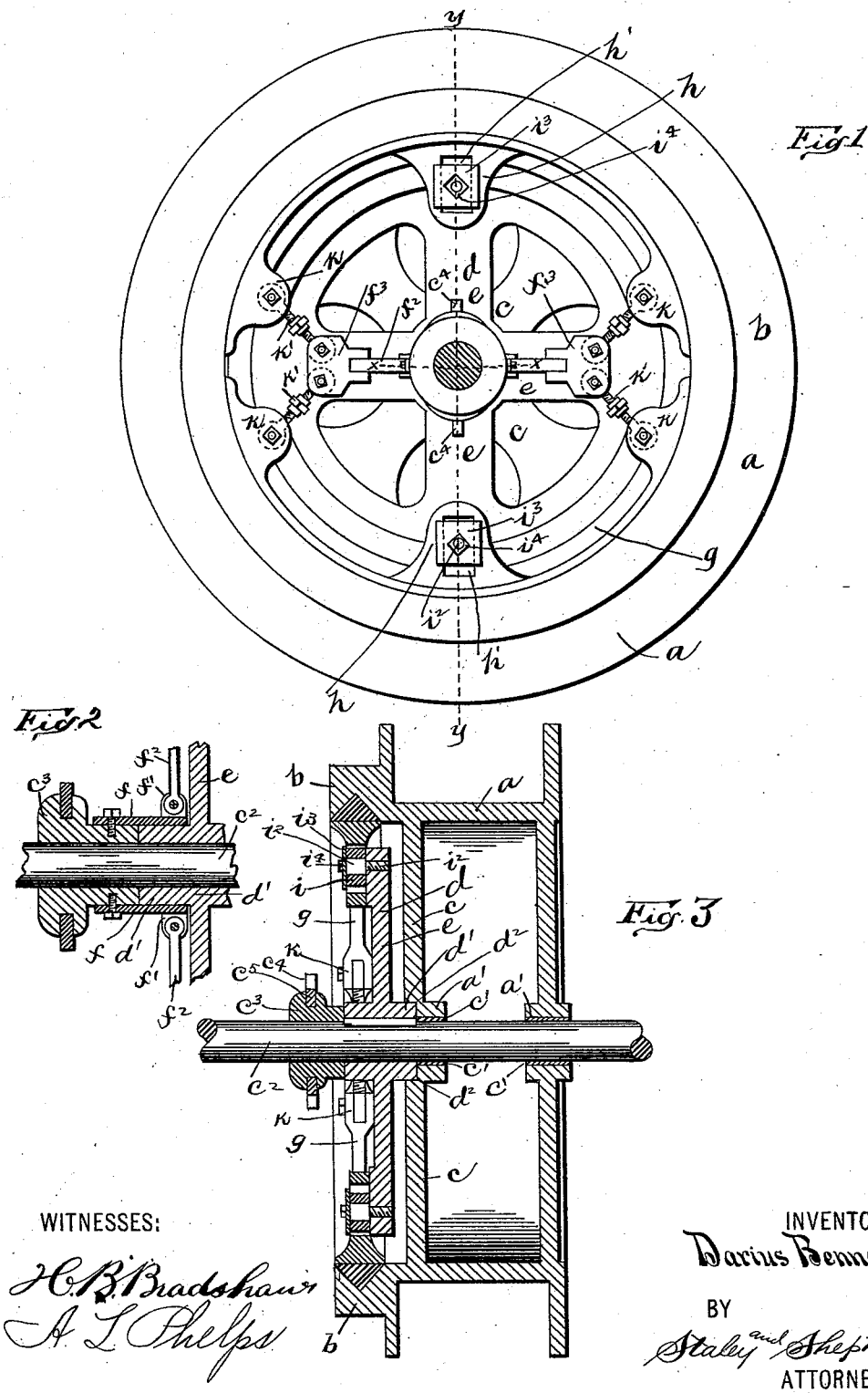

(No Model.)

D. BENNETT.
CLUTCH.

No. 529,015.  Patented Nov. 13, 1894.

WITNESSES:
H. B. Bradshaw
A. L. Phelps

INVENTOR
Darius Bennett
BY
Staley and Shepherd
ATTORNEYS

UNITED STATES PATENT OFFICE.

DARIUS BENNETT, OF NELSONVILLE, OHIO, ASSIGNOR TO THE NELSONVILLE FOUNDRY AND MACHINE COMPANY, OF SAME PLACE.

CLUTCH.

SPECIFICATION forming part of Letters Patent No. 529,015, dated November 13, 1894.

Application filed June 2, 1893. Serial No. 476,313. (No model.)

*To all whom it may concern:*

Be it known that I, DARIUS BENNETT, a citizen of the United States, residing at Nelsonville, in the county of Athens and State of Ohio, have invented a certain new and useful Improvement in Friction-Clutches, of which the following is a specification.

My invention relates to friction clutches and has particular relation to that class of clutches adapted to be used in conjunction with reels, such as are employed for the purpose of taking up and letting out hoisting ropes.

The objects of my invention are to provide an improved clutch of this character by means of which a ready, uniform and direct action of the clutch shoes may be obtained; to obviate the necessity of journaling the reel hub upon the driver hub and at the same time admit of the radial arms or spokes of the driver in being supported in close proximity to the reel spokes and to produce other improvements which will be more specifically pointed out hereinafter. These objects I accomplish in the manner illustrated in the accompanying drawings, in which—

Figure 1 is an end view of the reel having my improved clutch therein. Fig. 2 is a detail sectional view on line $x$ $x$ of Fig. 1; and Fig. 3 is a sectional view on line $y$ $y$ of Fig. 1.

Similar letters refer to similar parts throughout the several views.

$a$ represents a reel and $b$ represents the projecting end rim thereof. The reel $a$ is provided with central hubs $a'$, said hubs being supported from suitable radial reel spokes $c$ and bearing upon bushings $c'$ which surround the central shaft $c^2$.

$d$ represents a driving wheel which is provided with a central hub $d'$ and which as shown is keyed or otherwise secured upon the shaft $c^2$ within the rim portion $b$ of the reel. The rearwardly extending portion of the driver hub $d'$ is as shown in the drawings, made to fit loosely within a socket $d^2$ in the forward portion of the reel hub $a'$ thus bringing the spokes or radial arms $e$ of the driver into close proximity with the reel spokes $c$. Upon the shaft $c^2$ I provide a sliding clutch hub $c^3$, the latter being arranged on the outer side of the driver hub $d'$. This hub $c^3$ which is provided as shown with an enlarged outer end or head has its neck portion provided with two oppositely located rearwardly extending beams $f$, the latter being secured at their outer ends to said sliding hub and extending inwardly over the periphery of the hub $d'$ where they terminate in outturned lugs $f'$. To each of these lugs $f'$ is jointedly connected an outwardly extending arm $f^2$. The outer ends of these arms $f^2$ are as shown in the drawings, jointedly connected with toggle blocks $f^3$.

$g$ represents the clutch shoes of which there are two each describing the greater portion of a half circle and being adapted as shown to fit within the reel rim $b$. In forming each of these clutch shoes I provide the same with a central inwardly projecting lug $h$ in which is formed an elongated slotted opening $h'$. Within each of these slotted openings $h'$ is adapted to fit and slide a block $i$, the latter having a central opening therethrough through which passes the square outer end portion of a suitable bolt $i^2$, the inner end portion of the latter being firmly secured in the rim of the driver $d$. On the outer projecting end portion of the bolt $i^2$ I provide a suitable washer plate $i^3$ and nut $i^4$. Adjacent to each end of each of the shoes $g$, I provide a pair of inwardly projecting lugs $k$ within which are journaled the ends of toggle arms $k'$, the remaining ends of the latter being jointedly connected with the blocks $f^3$.

The sliding hub $c^3$ is provided with the usual pins $c^4$ projecting from the usual collar $c^5$ thereon and with these pins $c^4$ are adapted to be connected the arms of a suitable operating lever.

The throwing outward of the clutch hub $c^3$ upon the shaft $c^2$ must result as will readily be seen in an outward movement of the inner ends of the arms $f^2$ and in the consequent inward movement of the blocks $f^3$ and toggle arms $k'$. This movement of said toggle arms will result as will readily be seen in an inward movement of the clutch shoes. The slots $h'$ of the shoe lugs will serve as guideways in which the blocks $i^4$ may travel during such movement of the shoes, said guide slots thus serving to produce a direct inward movement of the shoes and prevent any tendency of an unequal motion of the ends of the latter. In this manner it will be seen that a ready action of the shoes is attained and any tendency toward the shoes binding against the reel arm at one end while the other end is pulled inward is obviated. It will also be observed that in my improved clutch the reel hub does not depend upon the driver hub for a bearing, but bears directly upon a bushing which is preferably of similar material to that of which the reel is formed. In this manner the wearing action of the steel shaft upon the material of which the reel is formed is obviated.

It will be noticed that a clutch formed as herein described is simple of construction and that its action will be direct and uniform.

Having now fully described my invention, what I claim, and desire to secure by Letters Patent, is—

The combination with a reel having a rim $b$ and a shaft upon which said reel turns, of a driver $d$ keyed upon said shaft, a sliding clutch hub on said shaft, two oppositely located clutch shoes $g$ adapted to fit within the rim $b$, a jointed connection between the ends of said clutch shoes and said sliding clutch hub, central slotted lugs $h$ on said shoes and a bolt or pin projecting from said driver through said slotted lug as described substantially as and for the purpose specified.

DARIUS BENNETT.

In presence of—
R. H. JACKSON,
W. C. HICKMAN.